United States Patent
Senthamil

(10) Patent No.: US 10,614,581 B2
(45) Date of Patent: *Apr. 7, 2020

(54) DEEP IMAGE LOCALIZATION

(71) Applicant: DAQRI, LLC, Los Angeles, CA (US)

(72) Inventor: Nalin Senthamil, Santa Clara, CA (US)

(73) Assignee: DAQRI, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/880,364

(22) Filed: Jan. 25, 2018

(65) Prior Publication Data

US 2018/0150961 A1 May 31, 2018

Related U.S. Application Data

(63) Continuation of application No. 15/199,832, filed on Jun. 30, 2016, now Pat. No. 9,934,587.

(51) Int. Cl.

| | |
|---|---|
| *G06T 7/80* | (2017.01) |
| *G06T 7/33* | (2017.01) |
| *G06T 19/00* | (2011.01) |
| *G06N 20/00* | (2019.01) |
| *G06F 16/29* | (2019.01) |
| *G06F 16/583* | (2019.01) |
| *G06T 7/73* | (2017.01) |
| *G06T 7/246* | (2017.01) |

(Continued)

(52) U.S. Cl.
CPC .............. *G06T 7/337* (2017.01); *G06F 16/29* (2019.01); *G06F 16/583* (2019.01); *G06K 9/00664* (2013.01); *G06N 3/04* (2013.01); *G06N 3/08* (2013.01); *G06N 20/00* (2019.01); *G06T 7/246* (2017.01); *G06T 7/75* (2017.01); *G06T 7/80* (2017.01); *G06T 19/006* (2013.01); *G06T 2207/10016* (2013.01); *G06T 2207/20081* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2016/0179830 A1* | 6/2016 | Schmalstieg | ........... G06T 17/05 707/722 |
| 2018/0005393 A1 | 1/2018 | Senthamil | |

OTHER PUBLICATIONS

Piras et al., "Sensors Integration for Smartphone Navigation: Performances and Future Challenges", The International Archives of the Photogrammetry, Remote Sensing and Spatial Information Sciences, vol. XL-3, 2014 ISPRS Technical Commission III Symposium, Sep. 5-7, 2014. (Year: 2014).*

(Continued)

*Primary Examiner* — Nicholas R Wilson

(74) *Attorney, Agent, or Firm* — Schwegman Lundberg & Woessner, P.A.

(57) ABSTRACT

An image localization system is described. A server stores a localization model that associates location and orientation data with each picture among a plurality of pictures. The server receives a query for a location and an orientation of a device. The query includes a first picture. A second picture that matches the first picture is identified. The server determines the location and the orientation of the device based on the location and orientation data corresponding to the second picture. The location and orientation data indicates position, orientation, three-dimensional geometry, gyroscope measurement, and accelerometer measurement.

16 Claims, 12 Drawing Sheets

(51) Int. Cl.
    *G06N 3/08*           (2006.01)
    *G06N 3/04*           (2006.01)
    *G06K 9/00*           (2006.01)

(56) References Cited

OTHER PUBLICATIONS

Zhu et al., "Image Mosaic Method Based on SIFT Features of Line Segment", 2014. (Year: 2014).*
"U.S. Appl. No. 15/199,832, Notice of Allowance dated Nov. 27, 2017", 23 pgs.
Kendall, et al., "PoseNet: A Convolutional Network for Real-Time 6-DOF Camera Relocalization", The IEEE International Conference on Computer Vision (ICCV), (2015), 2938-2946.
Snavely, N., et al., "Photo Tourism: Exploring Photo Collections in 3D", ACM Transactions on Graphics, 25(3), (2006), 835-846.
Ventura, et al., "Global Localization from Monocular Slam on a Mobile phone", IEEE, (Apr. 2014).

\* cited by examiner

DEEP IMAGE LOCALIZATION

CLAIM OF PRIORITY

This application is a continuation of and claims the benefit of priority of U.S. patent application Ser. No. 15/199,832, filed Jun. 30, 2016, entitled "Deep Image Localization", which is hereby incorporated by reference in its entirety.

TECHNICAL FIELD

The present application relates generally to the technical field of data processing and, in various example embodiments, to a system for determining a location based on an image.

BACKGROUND

Picture files typically contain metadata. Examples of metadata include location metadata identifying where a picture was taken, timestamp metadata identifying when the picture was taken, or camera model metadata identifying a model of the camera used to take the picture. One way to identify the location at which a picture was taken is by analyzing the location metadata. In cases where the metadata is missing, a triangulation analysis based on the other images can be performed to infer (e.g., extrapolate or interpolate) the location of the camera used to take the picture. However, the location metadata and the results of the triangulation analysis may not be accurate to pinpoint the geographic location of the camera used to the picture.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
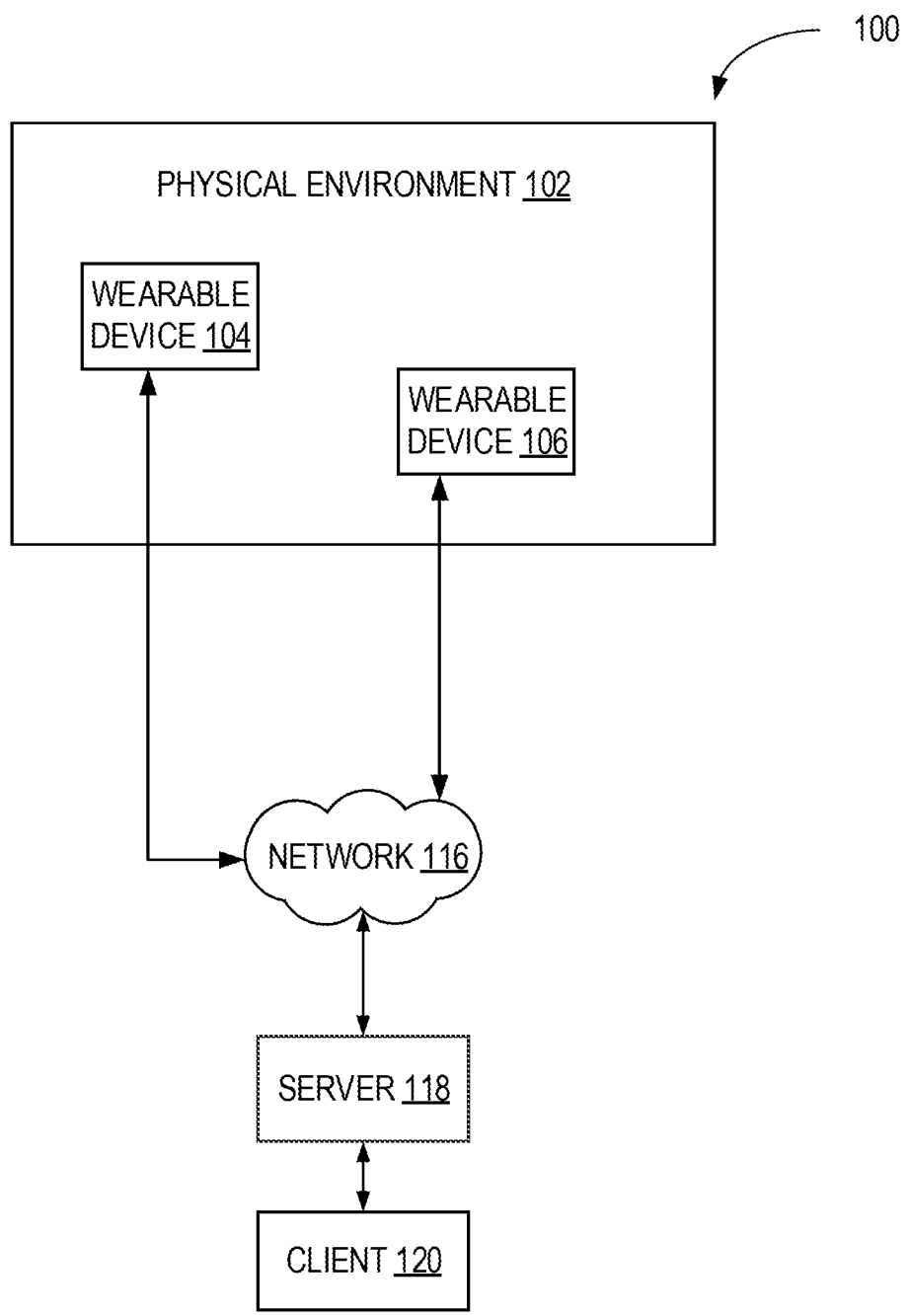
FIG. 1 is a block diagram illustrating a system for operating a method for deep image localization, in accordance with some example embodiments.

Example methods and systems for identifying a location, a pose, and inertial data based on one or more images are disclosed. In the following description, for purposes of explanation, numerous specific details are set forth in order to provide a thorough understanding of example embodiments. It will be evident, however, to one skilled in the art that the present embodiments may be practiced without these specific details.

A system and method for identifying a location and a pose of a device based on an image are described. The pose (e.g., within six degrees of freedom) can be estimated from any single image of a physical environment that is used for a training model. For example, the environment can be trained with pose and image sensor data that is automatically tagged as part of data capture. In one example application, the environment can be pre-mapped (e.g., pre-trained) with six degrees of freedom using an array of sensor data by multiple devices (e.g., wearable devices on users). Any user (with a mobile device or any device that has one or more of a same sensor) can be localized in the given environment. For example, a geographic location can be determined based on an image taken in the given environment.

In one example embodiment, a server includes a receiver, a training module, and an image localizer. The receiver receives visual inertial navigation (VIN) data and corresponding image data from devices, the VIN data indicating VIN states and corresponding poses of the devices. The training module generates a localization model in a high dimensional space based on the VIN data and corresponding image data from the plurality of devices. The image data includes images and feature vectors. The localization model correlates the VIN states and poses with each image among the plurality of images. An image localizer receives a query for a geographic location and a pose of a device. The query includes a picture. The image localizer maps the feature vector of the picture into high dimensional space on the localization model, the features then match the picture in the query, and thereby determines the geographic location and the pose of the device using the VIN state and pose corresponding to the mapped feature vectors of the image.

In another example embodiment, an AR device may be a computing device capable of generating a display of a virtual content layered on an image of a real world object. The AR device may be a wearable device such as a helmet, a watch, a visor, or eyeglasses. The AR device enables a wearer or user to view the virtual object layers on a view of real world objects. The AR device may render an image of the real world objects in a display. In another embodiment, the AR device may only render a three-dimensional (3D) model of a virtual object in a transparent visor of a helmet. The absolute position or relative position of the AR device in space may be tracked using a visual inertial navigation (VIN) module in the AR device. In some embodiments, the VIN module generates a plurality of video frames with at least one camera of a wearable device and inertial measurement unit (IMU) data with at least one IMU sensor of the wearable device. The VIN module tracks features in the plurality of video frames for each camera and synchronizes and aligns the plurality of video frames for each camera with the IMU data. The VIN module then computes a dynamic state of the wearable device based on the synchronized plurality of video frames with the IMU data. The VIN module generates and positions AR content in a display of the wearable device based on the dynamic state of the wearable device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a network diagram illustrating a network environment 100 suitable for identifying a geographic location based on an image, according to some example embodiments. The network environment 100 includes a physical environment 102, a client 120, and a server 118. The physical environment 102 may be a factory floor, a campus, or any other defined or limited geographic environment. Users may wear wearable devices 104 and 106 and walk around in the physical environment 102. Each user may have one or more wearable device. Each user may walk about the physical environment 102 in a planned path or unplanned path. The wearable devices 104 and 106 may be communicatively coupled to each other, the server 118, and the client 120 via a network 116 (e.g., computer network). The wearable devices 104 and 106, the client 120, and the server 118 may each be implemented in a computer system, in whole or in part, as described below with respect to FIG. 14. The server 118 may be part of a network-based system. For example, the network-based system may be or include a cloud-based server system that provides geographic and pose information to the client 120 based on an image captured in the physical environment 102.

Each wearable device may be worn or held by a user or worker located in the physical environment 102. Each wearable device 104 is capable of determining its relative geographic location and position/orientation in space in the physical environment 102 using inertial sensors (e.g., accelerometer, gyroscope) in the wearable device in combination with data from images produced from camera(s) in the wearable device 104. In one example embodiment, the wearable device 104 identifies and tracks feature points in the image data. The feature points data is combined with the inertial data to accurately track the position and pose of the wearable device 104 in space in the physical environment 102. Data from wearable device 104 and wearable device 106 can be used to train and generate a localization model to correlate images with geographic position/pose. For example, a geographic position and pose can be determined and identified from an image. Likewise, an image can be determined and identified based on geographic position and pose information. Therefore, the client 120 can submit a query to the server 118 to identify a geographic position and a pose of a wearable device based on a picture in the query. The server 118 uses the localization model to identify the geographic position and a pose of a wearable device based on the picture. Similarly, the client 120 can submit a query to the server 118 to identify pictures taken from the wearable devices 104 and 106 based on geographic position and pose information in the query.

In another example embodiment, the user of the wearable device 104 may be a construction worker in a plant. The user is not part of the network environment 100, but is associated with the corresponding wearable device. In one example embodiment, each wearable device may be a computing device with a display. For example, the wearable device may include a head mounted device with a display and a camera (e.g., a helmet with a display integrated in the visor or face shield or eye shield). The display and camera may be disposed on separate devices but may be communicatively connected. The computing device may be handheld or may be removably mounted to a head of the user. In one example, the display may be a screen that displays what is captured with a camera of the wearable device. In another example, the display of the device may be transparent such as in eye shields or visors of a helmet/hard hat or in lenses of wearable computing glasses. In other examples, the display may be a transparent display so that the user visually perceives virtual objects displayed in the display connected to objects in the real world. The display may be non-transparent and wearable by the user to cover the field of vision of the user.

The wearable devices 104 and 106 may be worn by users located at different locations in the physical environment 102. For example, wearable device 104 may be pointed towards at a first machine (not shown) in the physical environment 102. Wearable device 106 may be approaching a side of another machine (not shown) in the physical environment 102. For example, each wearable device may be mounted to the helmet of each construction worker in the physical environment 102 (e.g., a shipyard). The workers may be located at different locations around the shipyard. The construction workers may be able to view different parts of the physical environment at any given time. The construction workers may be users of an application in the corresponding wearable device that allows them to augment equipment (not shown) inside the physical environment with a virtual 3D model of the information relevant to the equipment (e.g., animation, color of status, visual cue on how to replace a part of an engine). For example, the wearable device 104 includes an AR application configured to provide the construction workers with an experience triggered by the equipment, a 2D physical object (e.g., a uniquely identifiable code on a marking on an equipment), a location (e.g., lobby, exit), or any visual or non-visual references (e.g., perceived corners of walls or furniture) in the real world physical environment. For example, the construction worker may point a camera of the corresponding wearable device to capture an image of the 2D physical object. The image is tracked and recognized locally in the wearable device using a local database such as a context recognition dataset module of the AR application of the wearable device. The local context recognition dataset module may include a library of virtual objects associated with real-world physical objects or references. The AR application then generates additional information corresponding to the image (e.g., a 3D model) and presents this additional information in a display of the wearable device in response to identifying the recognized image. If the captured image is not recognized locally at the wearable device, the wearable device downloads additional information (e.g., the 3D model), corresponding to the captured image, from a database of the server 118 over the network 116.

The wearable devices 104 and 106 may be used to capture video and images inside the physical environment 102.

Other sensor data may be captured such as data generated by equipment inside the physical environment 102. For example, the equipment may be a gauge. A reading from the gauge may be captured by the wearable devices. In one example embodiment, wearable devices 104 and 106 broadcast a video feed of what the corresponding users are looking at to the server 118. In another example, the wearable devices 104 and 106 capture frames or images at periodic intervals and broadcast them to the server 118. In another example, the wearable devices 104 and 106 broadcast images at regular intervals and/or intervals based on their geographic location relative to each other and relative to the equipment. For example, images may be captured in a sequential pattern such as clockwise or counterclockwise around the equipment. Other examples include combination of image capture from wearable device 104 and video feed from wearable device 106. The pattern of video/image capture may alternate based on movement, location, or orientation of each wearable device. For example, if the wearable device is looking away from an apparatus or the equipment, the rate of capture may be decreased or no image may be captured. In another example, if some of the wearable devices are located closer to each other relative to the proximity between the remaining wearable devices, the wearable devices that detect that they are close to each other may capture and broadcast video/images at a lower frame rate. Similarly, wearable devices that are relatively more distant from other wearable devices may capture and broadcast video/images at a higher frame rate.

The data (image data using a camera, location data using GPS or wifi, orientation data using an accelerometer, gyroscope) received from the wearable devices 104 and 106 can be used to reconstruct and generate a 3D model of the equipment or any other physical objects in the physical environment 102. For example, data captured with the wearable devices worn on construction workers at a factory plant may start capturing images/video as soon as they are in proximity to the equipment or when a distance or radius threshold is crossed. 2D images from different angles and locations around the apparatus may be used to reconstruct a 3D model of the apparatus using common computer vision systems with 3D object recognition algorithms. The 3D reconstruction model may be actively as an automatic post-processing step or on pull as actively related to a new query or equation introduced into the system well after the original data capture took place.

Furthermore, data received from the wearable devices 104 and 106 are provided to a computer vision object recognition system for filing and identifying objects in images and video frames. In one embodiment, the object recognition system may be part of the server 118. As such, the data from the wearable devices 104 and 106 may be used to reconstruct a 3D model of the equipment but also to keep a survey or an inventory of recognized objects. For example, the server 118 may keep track of who last used a hammer, when the hammer was used, and where the hammer was last used. The server 118 may also be used to compare the 3D model of the equipment with the 3D model of properly operating equipment. In another example, the server 118 may be used to identify or alert a wearable device based on a compliance detected based on the data received from the wearable device and a reference data. For example, the server 118 may detect a switch is toggled in a wrong position based on the reference data and notify the user of the corresponding wearable device.

In one example embodiment, the server 118 may remotely activate one or more sensors from one or more wearable devices. For example, if a user is interested in receiving a video feed related to the equipment, the server 118 determines which wearable device is within range of the equipment. The server 118 then instructs the wearable devices within range of the equipment to start broadcasting video feeds from the camera on the corresponding wearable devices. In another example, the user wearing the wearable device may be facing away from the equipment (e.g., the equipment is not within a field of view of the camera). The server 118 can still instruct rear cameras of the wearable device to generate video feeds of the equipment. The range of the sensor may be predefined as a distance from a wearable device to a physical object (e.g., equipment).

In another example embodiment, the server 118 may determine that no wearable devices are within range of an object of interest (e.g., equipment). The server 118 may then queue instructions to all the wearable devices to capture a video feed or an image of the object of interest when one of the wearable devices is within range of the equipment. In another example, a user may seek a higher resolution 3D model of the equipment. In such a scenario, the server 118 generates a 3D model of the equipment when a minimum number of wearable devices are within range of the equipment. The wearable devices may be within range of the equipment at the same time or asynchronously (within a time apart threshold—e.g., no less than 10 minutes apart). Other data may be captured from the wearable devices. For example, the instructions may include extracting sensor data from the equipment (e.g., gauge in the equipment reads level x). The extraction may be performed visually using a video feed of the equipment without communicating with the equipment. For example, the equipment may be "off-line" and not in communication with the network 116.

In one example embodiment, a wearable device may wish to offload some processes (tracking and rendering of virtual objects to be displayed in the wearable device) using the tracking sensors and computing resources of the server 118. The tracking sensors may be disposed throughout the physical environment 102 and used to track the location and orientation of the wearable devices externally without having to rely on the sensors internal to the corresponding wearable devices. The tracking sensors may be used additively or as failsafe/redundancy or for fine tuning. The tracking sensors may include optical sensors (e.g., depth-enabled 3D camera), wireless sensors (Bluetooth, wifi), GPS sensor, biometric sensors, and audio sensors to determine the location of the user having the wearable device, distance of the user to the tracking sensors in the physical environment (e.g., sensors placed in corners of a venue or a room), and the orientation of the wearable device to track what the user is looking at (e.g., direction at which the wearable device is pointed, wearable device pointed towards a player on a tennis court, wearable device pointed at a person in a room).

The computing resources of the server 118 may be used to determine and render virtual objects based on the tracking data (generated internally with wearable device or externally with the tracking sensors). The AR rendering is therefore performed on the server 118 and streamed back to the corresponding wearable device. As such, the wearable device does not have to compute and render any virtual object and may display the already rendered virtual object in a display of the wearable device.

In another embodiment, data from the tracking sensors may be used for analytics data processing at the server 118 for analysis on usage and how the user is interacting with the physical environment. For example, the analytics data may track the locations (e.g., points or features) on the physical or virtual object the user has looked, how long the user has looked at each location on the physical or virtual object, how the user held the wearable device when looking at the physical or virtual object, which features of the virtual object the user interacted with (e.g., such as whether a user tapped on a link in the virtual object), and any suitable combination thereof. The wearable device receives a visualization content dataset related to the analytics data. The wearable device then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 11-13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 116 may be any network that enables communication between or among machines (e.g., server 118), databases, and wearable devices 104 and 106. Accordingly, the network 116 may be a wired network, a wireless network (e.g., a mobile or cellular network), or any suitable combination thereof. The network 116 may include one or more portions that constitute a private network, a public network (e.g., the Internet), or any suitable combination thereof.

Figure 2:
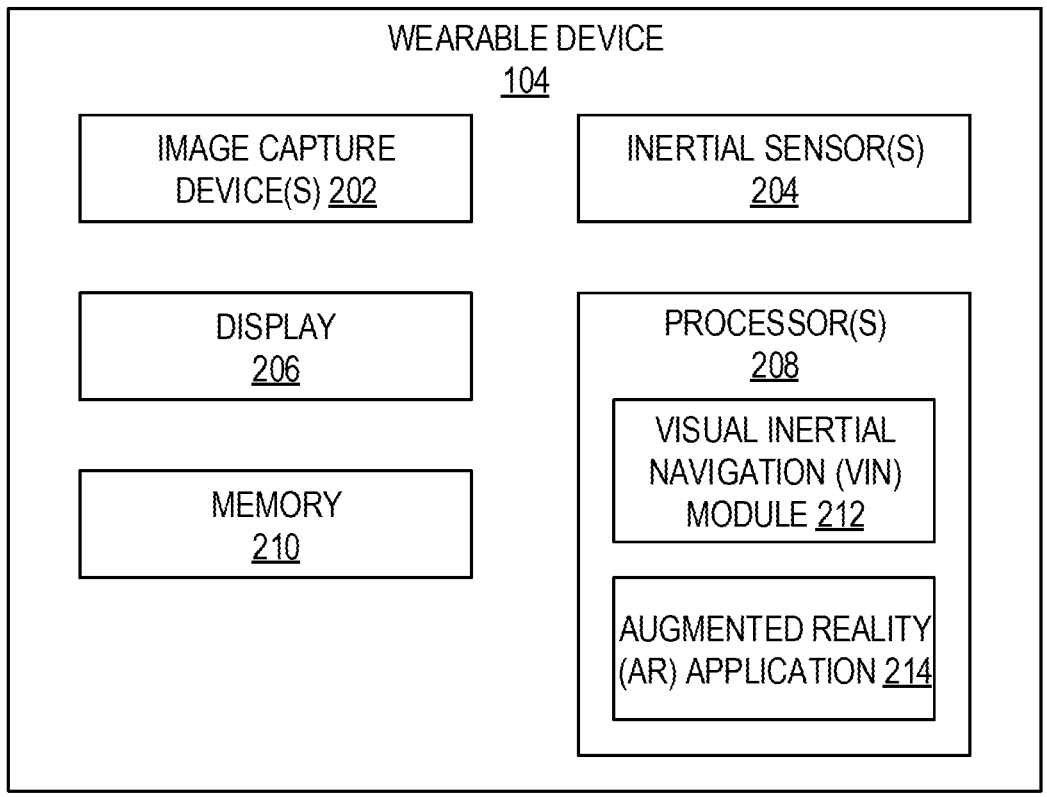
FIG. 2 is a block diagram illustrating a wearable device, in accordance with some example embodiments.

FIG. 2 is a block diagram illustrating the wearable device 104, in accordance with some example embodiments. The wearable device 104 comprises a portable or mobile computing device (e.g., a smartphone, a tablet computer, a wearable computing device, a vehicle computing device). In some embodiments, the wearable device 104 comprises a helmet with a heads-up display device. The heads-up display device is a device that provides a transparent display screen that presents content without requiring the user to look away from his or her usual viewpoint, such as with the user's head positioned up and looking forward, instead of angled down to look at a device. In some embodiments, the heads-up display device comprises an optical head-mounted display device, which may include, but is not limited to, a helmet mounted display device, glasses (e.g., Google Glass®), or other temporary or permanent form factors that can be either binocular or monocular. However, it is contemplated that other types of wearable devices 104 are also within the scope of the present disclosure. In some embodiments, the wearable device 104 comprises one or more image capture devices 202, an inertial sensor 204, a display 206, a memory 210, and one or more processors 208.

In some embodiments, the image capture device(s) 202 comprises a built-in camera or camcorder with which a user of the wearable device 104 can use to capture image data of visual content in a real-world environment (e.g., a real-world physical object). The image data may comprise one or more still images or videos. As will be discussed in further detail herein, the image capture device(s) 202 can also be used to capture image data related to the positioning or orientation of at least one of the user's eyes, such as a gaze direction of the user's eyes (e.g., where the user is looking or the rotational position of the user's eyes relative to the user's head or some other point of reference). Other configurations of the image capture device(s) 202 are also within the scope of the present disclosure.

In some embodiments, the inertial sensor(s) 204 comprises an inertial measurement unit (IMU) sensor such as an accelerometer and/or a gyroscope with which a user of the wearable device 104 can track a position and orientation of the wearable device 104 over time. For example, the inertial sensor 204 measures an angular rate of change and linear acceleration of the wearable device 104. The position of the wearable device 104 can then be used to generate and display AR content in the display 206. The location of the AR content within the display 206 may also be adjusted based on the dynamic state (e.g., position and orientation) of the wearable device 104 in space over time relative to stationary objects sensed by the image capture device(s) 202.

In some embodiments, the display screen 206 is configured to display the image data captured by the image capture device 202. In some embodiments, the display screen 206 is transparent or semi-opaque so that the user of the wearable device 104 can see through the display screen 206 to the visual content in the real-world environment.

In some embodiments, a visual inertial navigation (VIN) module 212 is stored in memory 210 or implemented as part of the hardware of the processor(s) 208, and is executable by the processor(s) 208. Although not shown, in some embodiments, the VIN module 212 may reside on a remote server and communicate with the wearable device 104 via the network 116.

The VIN module 212 computes the position and orientation of the wearable device 104. In one embodiment, given N wearable devices (1 or more cameras on each wearable device) over time, M stationary points tracked over time, and the gyroscope and accelerometer data over time, the VIN module 212 solves for the position and orientation of the wearable devices. The stationary points may be used as constraints with the inertial information to compute the position and orientation of the wearable devices.

The VIN module 212 accesses the following data in order to compute the position and orientation of the wearable device 104 in space over time:
Stationary world points $(x_i, y_i, z_i)$ where i represents the $i^{th}$ world point,
Gyroscope measurements $(g_{xt}, g_{yt}, g_{zt})$,
Accelerometer measurements $(a_{xt}, a_{yt}, a_{zt})$,
Gyroscope bias $(bg_{xt}, bg_{yt}, bg_{zt})$ and
Accelerometer bias $(ba_{xt}, ba_{yt}, ba_{zt})$ where t is time.
The VIN module 212 may generate a 3D map that consists of an (x,y,z) for each stationary point in the real physical world being tracked.

In some example embodiments, the wearable device 104 may consist of one or more image capture devices 202 (e.g., camera) mounted on a rigid platform with one or more Inertial Navigation Unit (IMU) sensor 204. The image capture devices 202 can be mounted with non-overlapping (distributed aperture) or overlapping (stereo or more) fields-of-view.

In some example embodiments, the VIN module 212 includes an algorithm that combines inertial information from the inertial sensor(s) 204 and one or more image capture device(s) 202 in close proximity and coupled to a rigid platform or a rig. In one embodiment, a rig may consist of multiple cameras mounted on a rigid platform with an inertial navigation unit. A rig may thus have at least one inertial navigation unit and at least one camera.

In some example embodiments, an AR application 214 is stored in memory 210 or implemented as part of the hardware of the processor 208, and is executable by the processor 208. The AR application 214 may provide the user with an AR experience triggered by identified objects in a physical environment. The physical environment may include identifiable objects such as a 2D physical object (e.g., a picture), a 3D physical object (e.g., a factory machine), a location (e.g., at the bottom floor of a factory), or any references (e.g., perceived corners of walls or furniture) in the real-world physical environment. The AR application 214 may include a computer vision recognition feature to determine corners, objects, lines, and letters. Example components of the AR application 214 are described in more detail below with respect to FIG. 4.

The inertial sensor(s) 204 measures angular rate of change and linear acceleration. The image capture device(s) are used in a tracking system that tracks features in the video images. The image features could be corner or blob features extracted from the image. For example, first and second local patch differentials over the image could be used to find corner and blob features. The tracked image features are used to infer 3D geometry of the environment and are combined with the inertial information to estimate position and orientation of the wearable device 104.

For example, the 3D location of a tracked point is computed by triangulation that uses the observation of the 3D point in all cameras over time. The 3D estimate is improved as additional evidence or data is accumulated over time. The VIN module 212 minimizes the reprojection of the 3D points into the cameras over time, and the residual between the estimate and the IMU propagation estimate. The IMU propagation solves the differential equations from an estimated rig state used as an initial starting point at time k and propagating the state to the next rig at k+1 using the gyroscope and accelerometer data between the rigs.

In some embodiments, the VIN module 212 is used to accurately localize the wearable device 104 in space and simultaneously map the 3D geometry of the space around the wearable device 104. The position and orientation of the wearable device 104 can be used in the AR application 214 by knowing precisely where the wearable device 104 is in real-time and with low-latency to project a virtual world into the display 206 of the wearable device 104. The relation between the IMU/Camera and the Display System is known and calibrated off-line during a calibration process. The calibration process consists of observing a known 2D or 3D pattern in the world in all the cameras on the wearable device 104 and IMU data over several frames. The pattern is detected in every frame and used to estimate the placement of the cameras and IMU on the wearable device 104.

Figure 3:
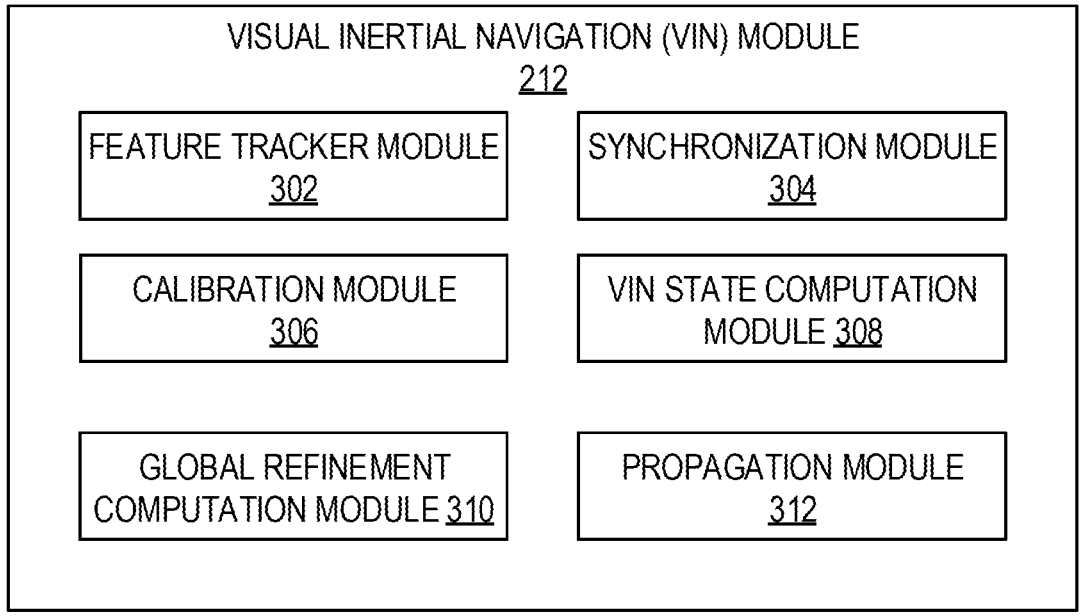
FIG. 3 is a block diagram illustrating a visual inertial navigation (VIN) module, in accordance with some example embodiments.

FIG. 3 illustrates an example embodiment of the VIN module 212 that includes a feature tracker module 302, a synchronization module 304, a calibration module 306, a VIN state computation module 308, a global refinement computation module 310, and a propagation module 312.

The feature tracker module 302 tracks features in video frames for each camera. There is one feature tracker for each image capture device(s) 202. The feature tracker module 302 receives the video frames and tracks features in the image over time. The features could be interest points or line features. The feature tracker consists of extracting a local descriptor around each feature and matching it to subsequent camera frames. The local descriptor could be a neighborhood pixel patch that is matched by using, for example, Normalized Cross-Correlation (NCC).

The synchronization module 304 aligns the video frames and IMU data according to time as the information may arrive asynchronously. The camera frames and IMU data contain a timestamp of when the data was captured. The timestamps are used to align the data by time so that the VIN module 212 can process the data in temporal order.

The calibration module 306 calibrates the image capture device 202 off-line for focal length, principal point, pixel aspect ratio, lens distortion, and extrinsic calibration. Furthermore, the calibration module 306 calibrates the inertial sensor 204 for noise, scale and bias, and extrinsic calibration. In some embodiments, a calibration process is performed on the components of the wearable device 104 prior to performance of the operations. This calibration process may comprise the calibration of any sensors, display surfaces, image capture devices, and projectors of the wearable device 104 so that they are all synchronized, running off of the same clock, and knowing the attributes (e.g., location, positioning) of each other in order to facilitate their working together as a cohesive unit. The calibration module 306 also applies the calibration information to the data.

The VIN state computation module 308 is configured to combine the tracked feature information from all the image capture device(s) 202 and the inertial sensor(s) 204 to estimate the state consisting of position, orientation, 3D geometry, and gyroscope and accelerometer bias and scale. The sensor state information is computed by an optimization process that maximizes the probability of the state using tracks from the feature tracker modules 302 and inertial data from the IMU module. The probability is a function of the re-projection error of the triangulated feature points as the camera moves through space, and the inertial constraints from the IMU. The probability can be maximized by different methods, for example, Bundle Adjustment, Particle Filter, or Kalman Filter. In some example embodiments, the VIN state computation module 308 updates the state on every frame from the camera system or image capture device(s) 202 in real-time.

The global refinement module 310 refines the real-time estimates from the VIN state computation module 308 using global information. Global information consists of more accurate 3D geometry previously estimated from the wearable device 104, or additional sensors such as Time-of-Flight (ToF) and Structured Light. Since the VIN state computation module 308 operates with relatively low-latency, the VIN state computation module 308 is constrained by how much information it can use to produce an estimate. As such, the global refinement computation module 310 uses all the available historical information to produce more accurate position, orientation, and 3D geometry. The global refinement computation module 310 can use computationally more expensive techniques to refine the estimates of the states. Global Bundle Adjustment or Particle Filters are examples of techniques to solve the global refinement problem.

The propagation module 312 uses the latest inertial sensor data (gyroscope and accelerometer bias and scale) from the VIN state computation module 208 to estimate the position and orientation of the wearable device 104 with very low-latency for the display 206. The propagation module 312 integrates the IMU data from the latest known state estimate of the wearable device 104 to compute a low latency state estimate. The display 206 uses the state information to render graphical content on the display 206 so that it is registered to the environment with low-latency and little or no jitter.

Figure 4:
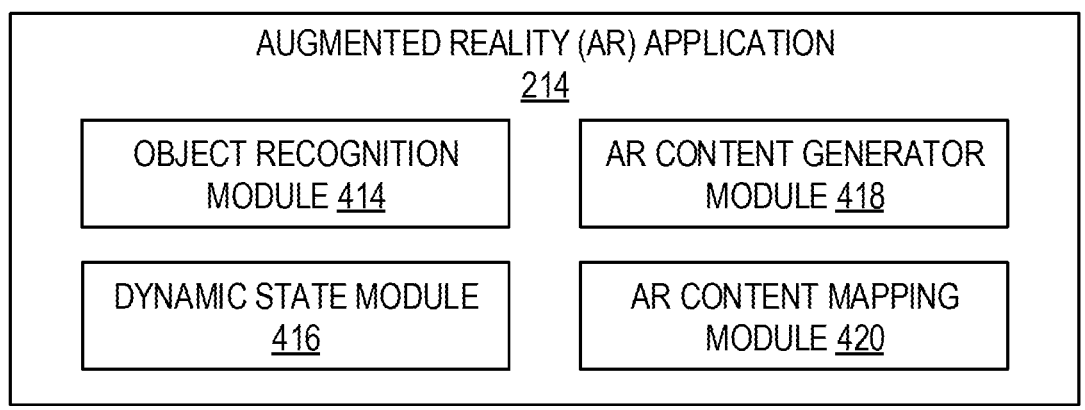
FIG. 4 is a block diagram illustrating an augmented reality (AR) application module, in accordance with some example embodiments.

FIG. 4 is a block diagram illustrating the AR application 214, in accordance with some example embodiments. The AR application 214 includes an object recognition module 414, a dynamic state module 416, an AR content generator module 418, and an AR content mapping module 420.

The object recognition module 414 identifies objects that the wearable device 104 (or image capture device 202) is pointed to. The object recognition module 414 may detect, generate, and identify identifiers such as feature points of a physical object being viewed or pointed at by the wearable device 104, using the image capture device 202 to capture the image of the physical object. As such, the object recognition module 414 may be configured to identify one or more physical objects. In one example embodiment, the object recognition module 414 may identify objects in many different ways. For example, the object recognition module 414 may determine feature points of the object based on several image frames of the object. The identity of the object is also determined by using any visual recognition algorithm. In another example, a unique identifier may be associated with the object. The unique identifier may be a unique wireless signal or a unique visual pattern such that the object recognition module 414 can look up the identity of the object based on the unique identifier from a local or remote content database.

The dynamic state module 416 receives data identifying the latest dynamic state (position and orientation) of the wearable device 104 from the VIN module 212.

The AR content generator module 418 generates AR content based on an identification of the object. For example, the AR content may include visualization of data related to the object. The visualization may include rendering a 3D object (e.g., a virtual arrow on a floor), a 2D object (e.g., an arrow or symbol next to a machine), and displaying other objects in different colors visually perceived on other physical devices.

The AR content mapping module 420 maps the location of the AR content to be displayed in the display 206 based on the dynamic state. As such, the AR content may be accurately displayed based on a relative position of the wearable device 104 in space or in a physical environment. When the user moves, the inertial position of the wearable device 104 is tracked and the display of the AR content is adjusted based on the new inertial position. For example, the user may view a virtual object visually perceived to be on a physical table. The position, location, and display of the virtual object is updated in the display 206 as the user moves around the physical table (e.g., away from, closer to, around).

Figure 5:
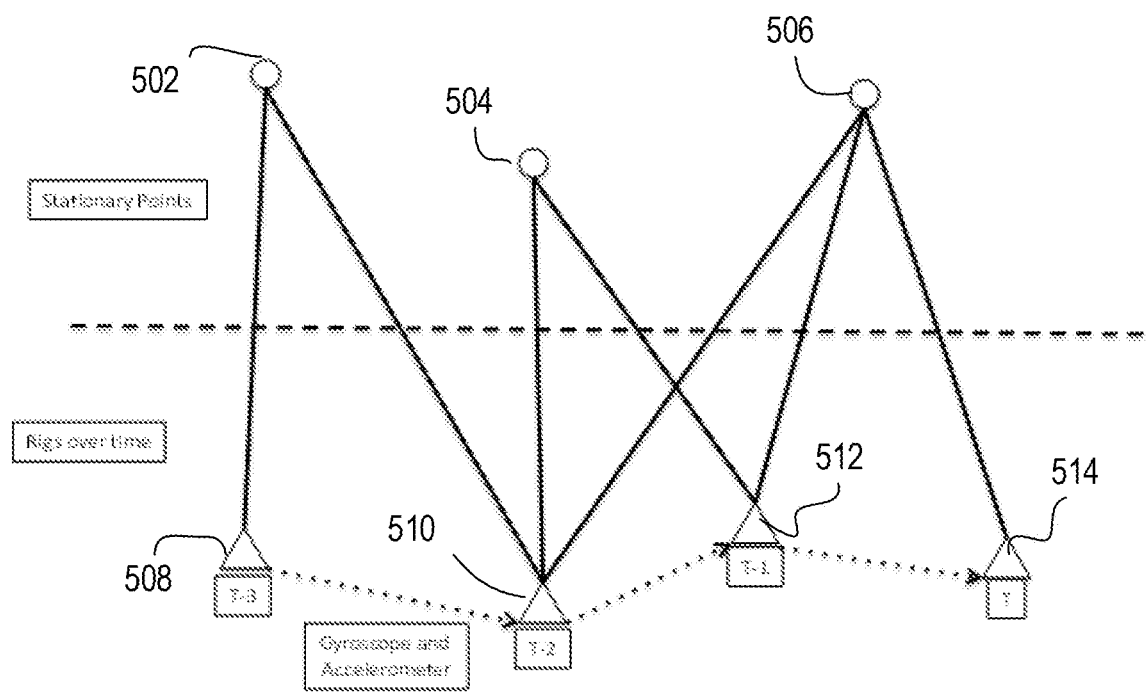
FIG. 5 illustrates inertial tracking of a wearable device relative to stationary points, in accordance with some example embodiments.

FIG. 5 illustrates inertial tracking of the wearable device 104 relative to stationary points, in accordance with some embodiments. The points 502, 504, and 506 are stationary relative to the rigs 508, 510, 512, and 514 over time. In this example, point 502 can be observed by rig 508 and 510. The gyroscope and accelerometer data connect the rig 508 to 510, 510 to 512, and 512 to 514.

Figure 6:
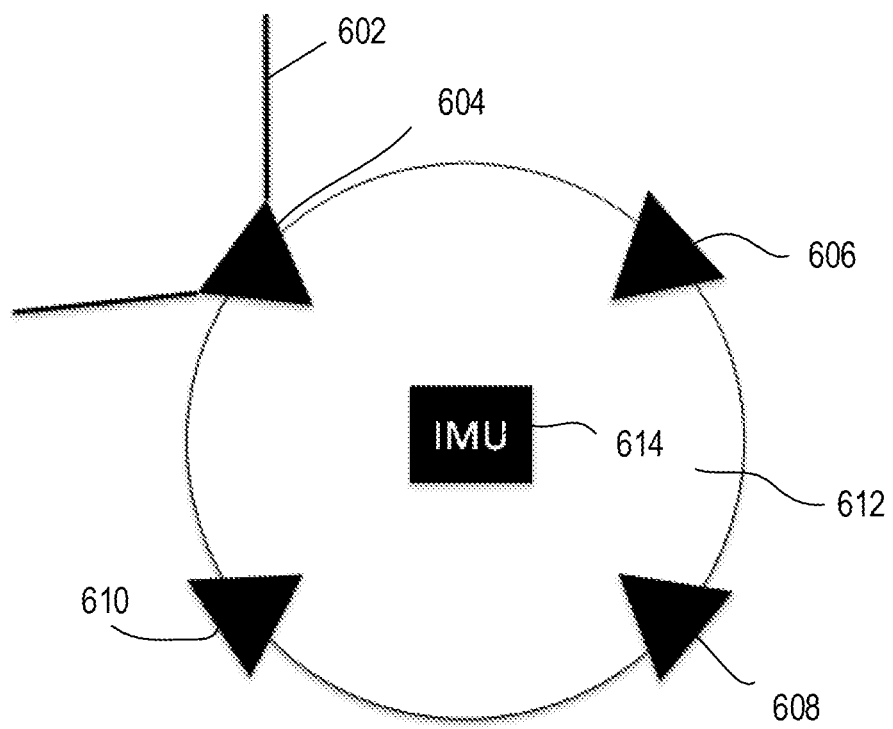
FIG. 6 illustrates an example of a wearable device incorporating VIN, in accordance with some example embodiments.

FIG. 6 illustrates an example of a VIN wearable device 612 incorporating visual inertial navigation, in accordance with some embodiments. The VIN wearable device 612 includes an IMU 614 and four cameras 604, 606, 608, and 610 disposed around the VIN wearable device 612 to capture overlapping field of views 602.

Figure 7:
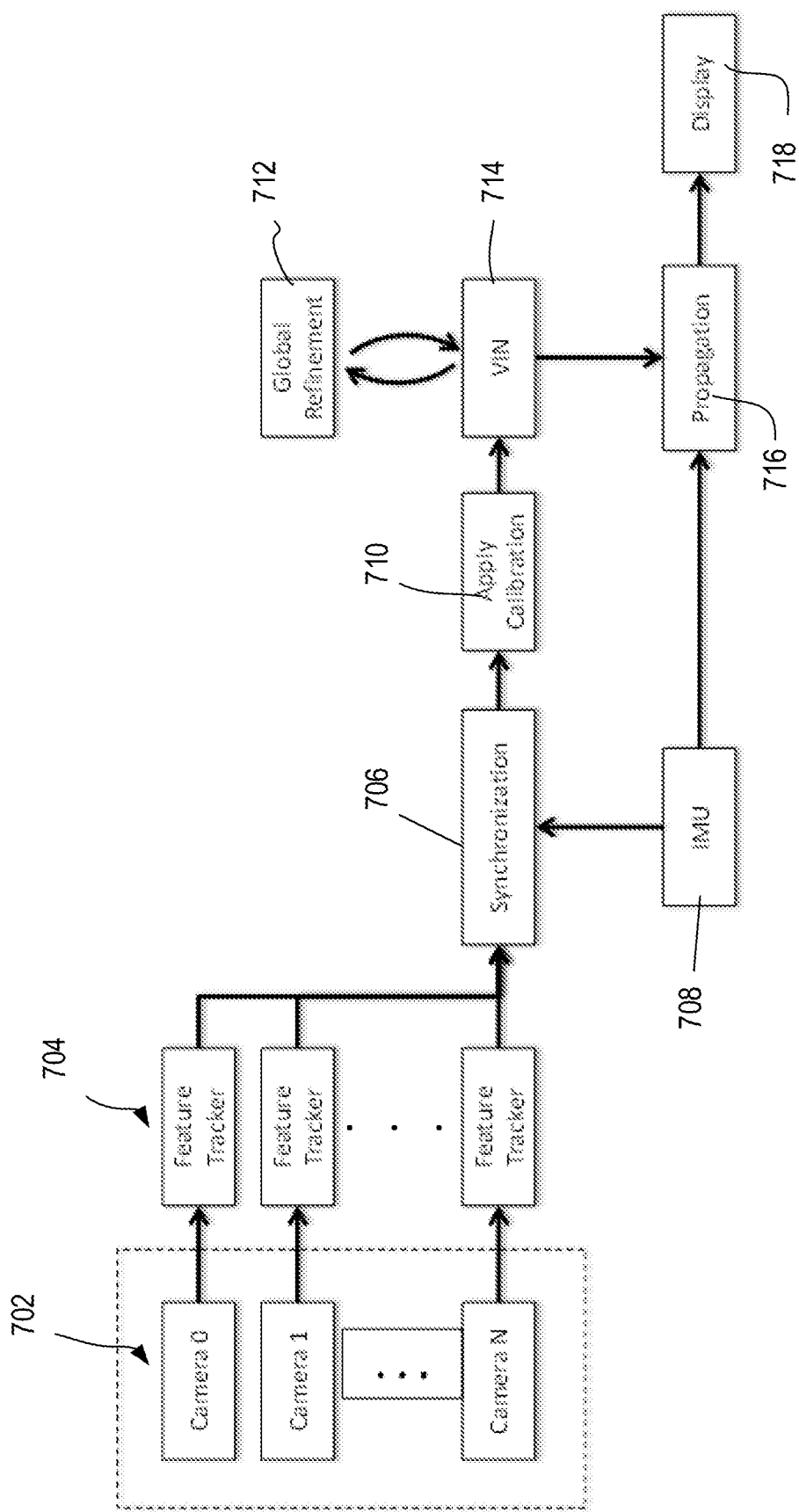
FIG. 7 is a block diagram illustrating an example architecture of visual inertial navigation, in accordance with some example embodiments.

FIG. 7 is a block diagram illustrating an example architecture of visual inertial navigation, in accordance with some embodiments. A system may include several cameras 702. A feature tracker 704 is associated with each camera. Each feature tracker 704 tracks features from video frames from the corresponding camera 702. The synchronization module 706 synchronizes data from the feature trackers 704 and data from the IMU module 708. A calibration module 710 applies calibration to the synchronized data. The VIN module 714 generates a state that is adjusted with global refinement 712. A propagation module 716 outputs the best estimate of the state to the display 718.

Figure 8:
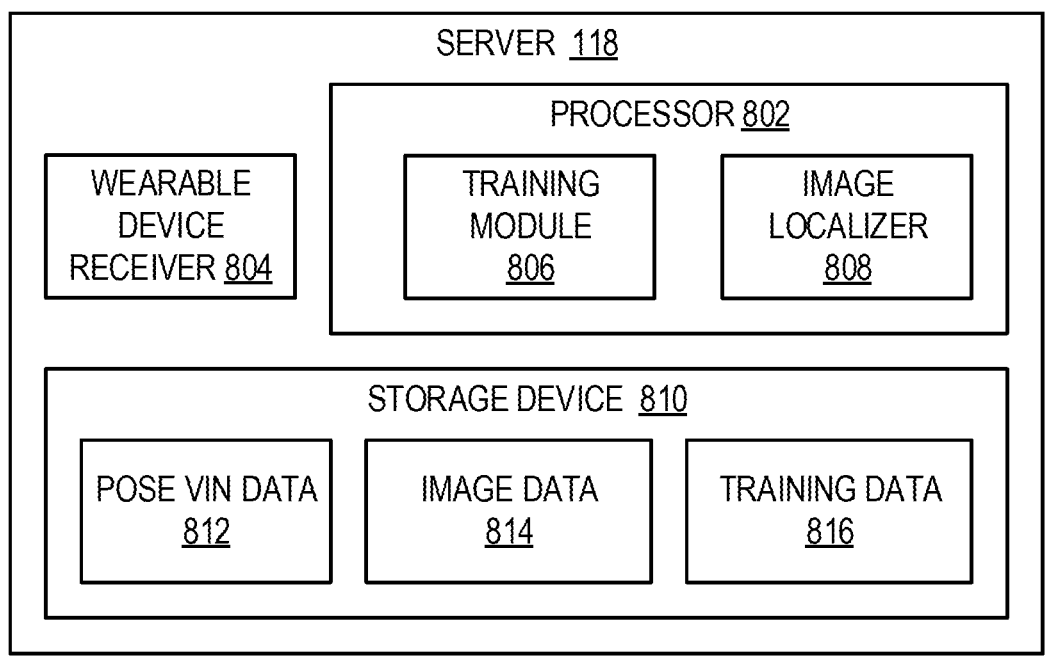
FIG. 8 is a block diagram illustrating a server, in accordance with some example embodiments.

FIG. 8 is a block diagram illustrating a server, in accordance with some example embodiments. The server 118 includes a hardware processor 802, a wearable device receiver 804, and a storage device 810. The hardware processor 802 includes a training model 806 and an image localizer 808. The wearable device receiver 804 receives data from the wearable devices 104 and 106. In particular, the data includes position and pose information (e.g., VIN state information), corresponding images or video frames, and corresponding sets of features.

The training (learning) module 806 is configured to train a localization model to predict location and pose information based on image information. One example of training the localization model includes deep learning architecture such as convolutional neural network or recurrent neural networks.

The image localizer 808 is configured to receive a query from the client 120. The query includes, for example, an image (e.g., a picture or a video frame). The image localizer 808 accesses the localization model to determine and identify the geographical location and pose associated with the image from the query. In one example embodiment, the image localizer 808 determines feature vectors in the image and compares those with the trained model in high dimensional space (e.g., multi-dimensional space). The image localizer 808 then identifies the corresponding geographic position and pose associated with the feature vectors from the training data (or image data 814).

The storage device 810 stores the VIN state and pose data 812, image data 814 received from the wearable device receiver 804, and training data 816 generated by the training module 806.

Figure 9:
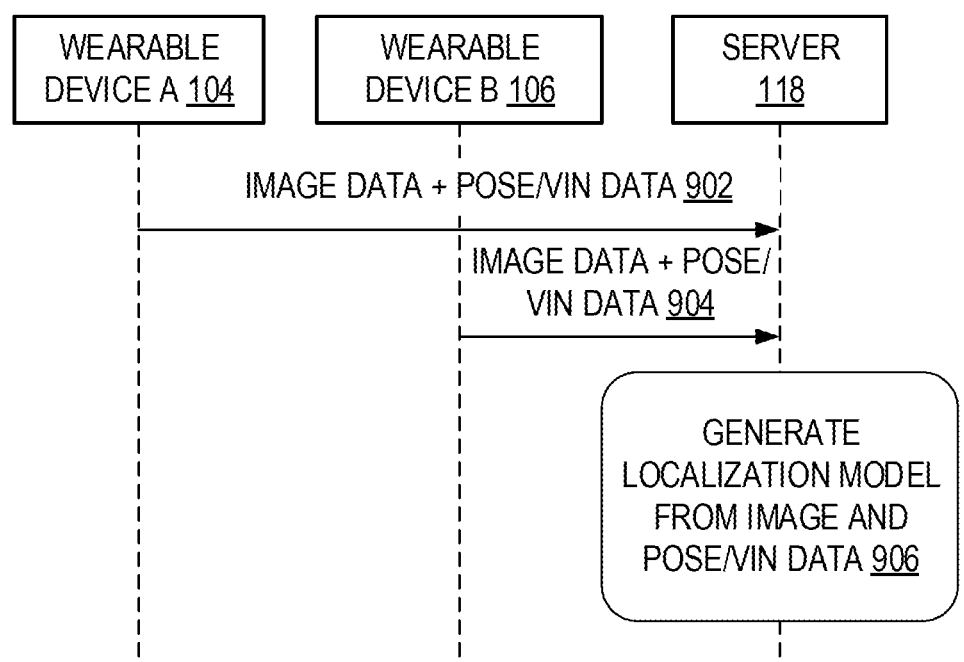
FIG. 9 is an interaction diagram illustrating interactions between wearable devices and a server.

FIG. 9 is an interaction diagram illustrating interactions between wearable devices 104, 106, and the server 118. The wearable device 104 sends image data and pose and VIN data 902 to the server 118. The wearable device 106 sends image data and pose and VIN data 904 to the server 118. At block 906, the server 118 generates a localization model based on the image data and pose and VIN data 902 and 904 received from wearable devices 104 and 160.

Figure 10:
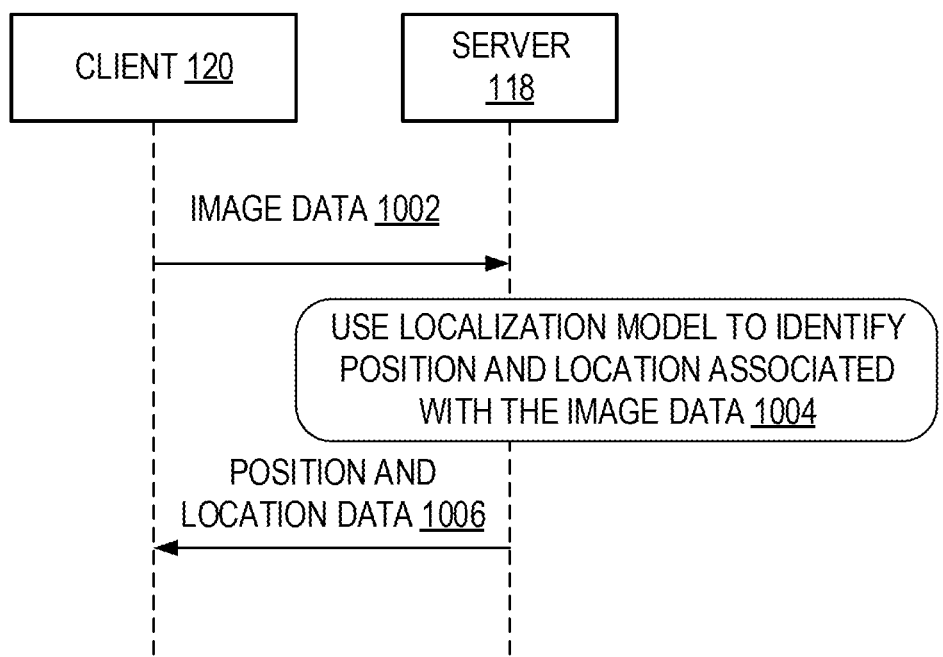
FIG. 10 is an interaction diagram illustrating interactions between a client and a server.

FIG. 10 is an interaction diagram illustrating interactions between the client 120 and the server 118. The client 120 submits a query to the server 118. The query includes a request to identify a geographic location and pose based on an image data 1002. The server 118 uses the localization model to identify the position and location associated with the image data at block 1004. At block 1006, the server 118 sends the position and location data 1006 to the client 120.

Figure 11:
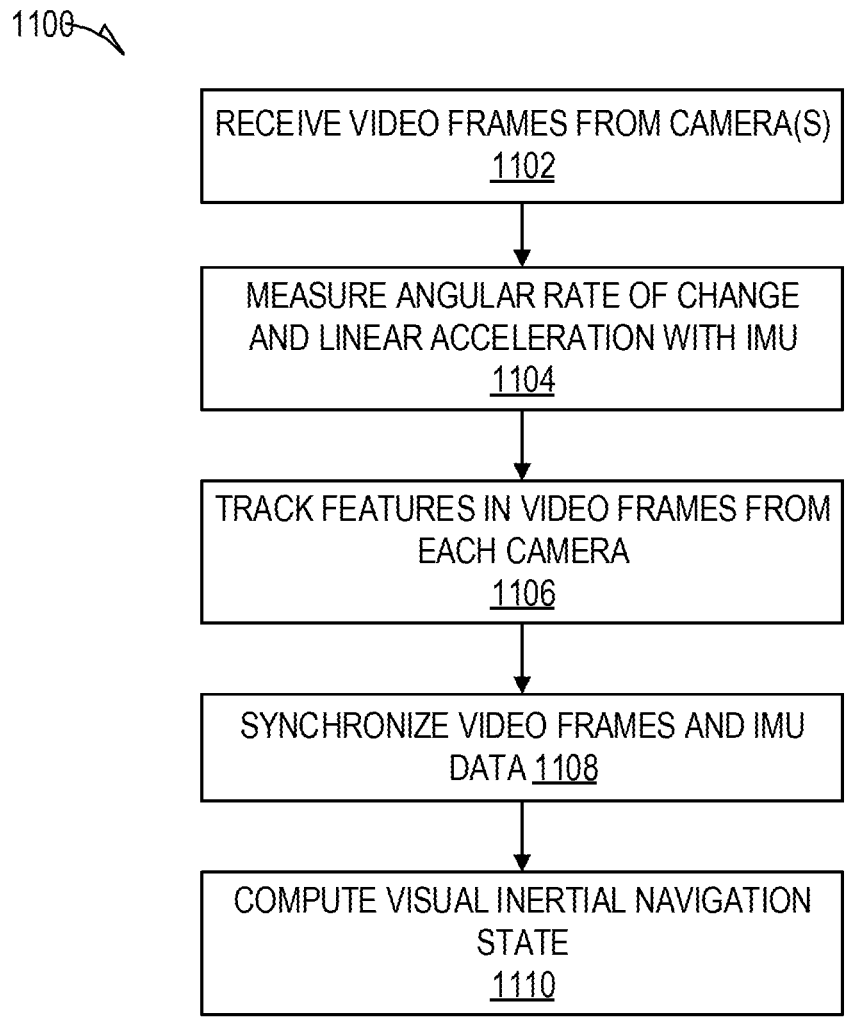
FIG. 11 is a flowchart illustrating a method for visual inertial navigation, in accordance with some example embodiments.

FIG. 11 is a flowchart illustrating a method 1100 for visual inertial navigation, in accordance with some embodiments. At operation 1102, the VIN module 212 receives video frames from image capture device 202 (e.g., cameras). In some example embodiments, operation 1102 may be implemented with the image capture sensor(s) 202. The image capture sensor(s) 202 generates the video frames.

At operation 1104, the VIN module 212 measures the angular rate of change and linear acceleration is measured.

In some example embodiments, operation 1104 may be implemented using the inertial sensor(s) 204.

At operation 1106, the VIN module 212 tracks features in video frames from each camera. In some example embodiments, operation 1106 is implemented using the feature tracker module 302.

At operation 1108, the VIN module 212 synchronizes video frames with the IMU data. In some example embodiments, operation 1108 is implemented using the synchronization module 304.

At operation 1110, the VIN module 212 computes a VIN state based on the synchronized video frames. In some example embodiments, operation 1110 is implemented using the VIN state computation module 308.

Figure 12:
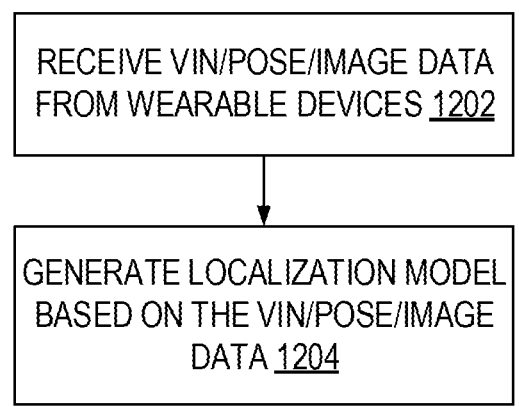
FIG. 12 is a flowchart illustrating a method for generating a localization model based on visual inertial navigation data, in accordance with some example embodiments.

FIG. 12 is a flowchart illustrating a method for generating a localization model based on visual inertial navigation data, in accordance with some example embodiments. At operation 1202, the training module 806 receives location/pose data, corresponding image data, and feature points from wearable devices 104 and 106. At operation 1204, the training module 806 trains and generates a localization model based on the location/pose data, corresponding image data, and feature vectors from wearable devices 104 and 106.

Figure 13:
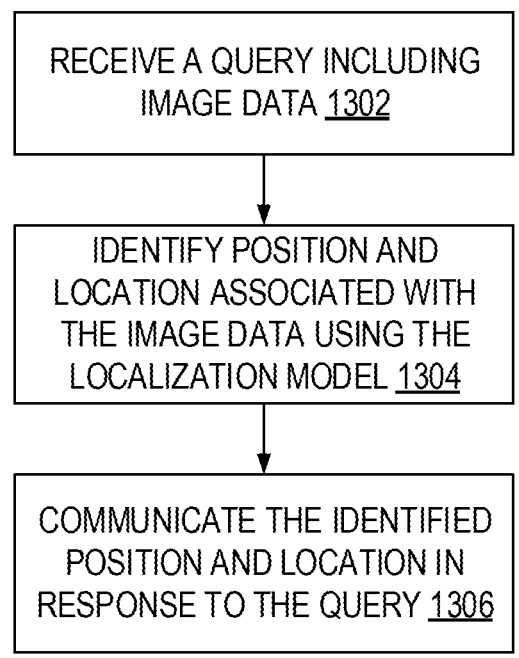
FIG. 13 is a flowchart illustrating a method for identifying a location and inertial data associated with an image, in accordance with some example embodiments.

FIG. 13 is a flowchart illustrating a method for identifying a location and inertial data associated with an image, in accordance with some example embodiments. At operation 1302, the image localizer 808 receives a query (including an image data) from the client 120. At operation 1304, the image localizer 808 identifies position and location associated with the image data using the localization model generated by the training module 806. At operation 1306, the image localizer 808 communicates the identified position and location to the client 120.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 116 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, a data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
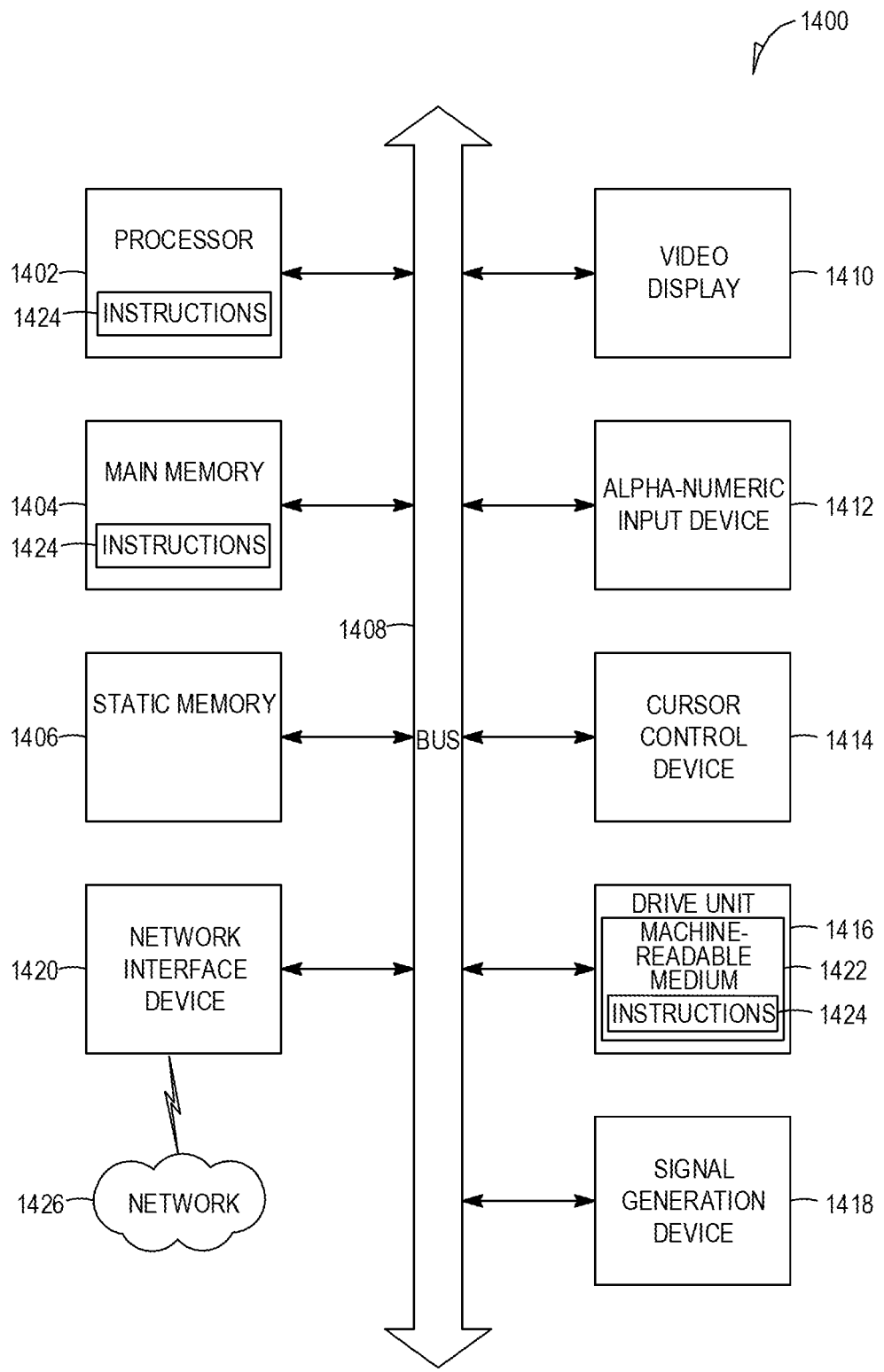
FIG. 14 is a block diagram of an example computer system on which methodologies described herein may be executed, in accordance with some example embodiments.

FIG. 14 is a block diagram of a machine in the example form of a computer system 1400 within which instructions 1424 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker), and a network interface device 1420.

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that stores the one or more instructions 1424 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those skilled in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A server comprising:
a storage device configured to store a localization model that associates location and orientation data with each picture among a plurality of pictures; and
one or more hardware processor configured to perform operations comprising:
receiving a query for a location and an orientation of a device, the query including a first picture and a request to identify a geographic position and a pose of the device based on the first picture;
identifying a second picture, from the localization model, that corresponds to the first picture; and
determining the location and the orientation of the device based on the location and orientation data corresponding to the second picture, the location and orientation data indicating position, orientation, three-dimensional geometry, gyroscope measurement, and accelerometer measurement,
wherein the device comprises:
a camera configured to capture the picture and generate a plurality of video frames;
at least one inertial sensor configured to generate inertial data of the device; and
one or more hardware processors configured to perform operations comprising:
tracking at least one feature in the plurality of video frames;
synchronizing and aligning the plurality of video frames based on the inertial data;
computing a Visual Inertial Navigation (VIN) state of the device based on the synchronized plurality of video frames with the inertial data;
receiving VIN data and corresponding image data from a plurality of devices, the VIN data indicating VIN states and corresponding poses of the plurality of devices; and
training, using a neural network, the localization model based on the VIN data and corresponding image data from the plurality of devices, the image data including a plurality of images, the localization model correlating the VIN states and poses with each image among the plurality of images.

2. The server of claim 1, wherein the operations further comprise:
receiving location and orientation data and corresponding pictures from a plurality of devices; and
forming the localization model based on the location and orientation data and the corresponding pictures from the plurality of devices.

3. The server of claim 2, wherein the operations further comprise:
determining features in the plurality of pictures from the localization model; and
associating the features and relative positions of the features in each picture of the plurality of pictures with the corresponding location and orientation data.

4. The server of claim 3, wherein the operations further comprise:
identifying features in the first picture;
comparing the features in the first picture with the features in the second picture; and
determining that the features in the first picture match the features in the second picture based on the comparison.

5. The server of claim 1, wherein the location of the device identifies a geographic location of the device when the device generated the picture, and the orientation of the device identifies a pose of the device when the device generated the picture.

6. The server of claim 1, wherein the operations at the device further comprise:
calibrating the camera off-line for at least one of focal length, principal point, pixel aspect ratio, or lens distortion;
calibrating the at least one inertial sensor for at least one of noise, scale, or bias; and
applying calibration information to the plurality of video frames and the inertial data.

7. The server of claim 1, wherein the inertial data indicates an angular rate of change and a linear acceleration.

8. The server of claim 1, wherein the features comprise predefined stationary interest points and line features.

9. A computer-implemented method comprising:
storing a localization model that associates location and orientation data with each picture among a plurality of pictures;
receiving a query for a location and an orientation of a device, the query including a first picture and a request to identify a geographic position and a pose of the device based on the first picture;
identifying a second picture, from the localization model, that corresponds to the first picture; and determining the location and the orientation of the device based on the location and orientation data corresponding to the second picture, wherein the location and orientation data indicates position, orientation, three-dimensional geometry, gyroscope measurement, and accelerometer measurement, wherein the device comprises:

a camera configured to capture the picture and generate a plurality of video frames;

at least one inertial sensor configured to generate inertial data of the device; and one or more hardware processors configured to perform operations comprising:

tracking at least one feature in the plurality of video frames;

synchronizing and aligning the plurality of video frames based on the inertial data;

computing a Visual Inertial Navigation (VIN) state of the device based on the synchronized plurality of video frames with the inertial data;

receiving VIN data and corresponding image data from a plurality of devices, the VIN data indicating VIN states and corresponding poses of the plurality of devices; and training, using a neural network, the localization model based on the VIN data and corresponding image data from the plurality of devices, the image data including a plurality of images, the localization model correlating the VIN states and poses with each image among the plurality of images.

10. The computer-implemented method of claim 9, further comprising:

receiving location and orientation data and corresponding pictures from a plurality of devices; and forming the localization model based on the location and orientation data and the corresponding pictures from the plurality of devices.

11. The computer-implemented method of claim 10, further comprising:

determining features in the plurality of pictures from the localization model; and associating the features and relative positions of the features in each picture of the plurality of pictures with the corresponding location and orientation data.

12. The computer-implemented method of claim of claim 11, further comprising:

identifying features in the first picture;

comparing the features in the first picture with the features in the second picture; and determining that the features in the first picture match the features in the second picture based on the comparison.

13. The computer-implemented method of claim of claim 9, wherein the location of the device identifies a geographic location of the device when the device generated the picture, and the orientation of the device identifies a pose of the device when the device generated the picture.

14. The computer-implemented method of claim of claim 9, further comprising:

calibrating the camera off-line for at least one of focal length, principal point, pixel aspect ratio, or lens distortion;

calibrating the at least one inertial sensor for at least one of noise, scale, or bias; and applying calibration information to the plurality of video frames and the inertial data.

15. The computer-implemented method of claim of claim 9, wherein the inertial data indicates an angular rate of change and a linear acceleration, and wherein the features comprise predefined stationary interest points and line features.

16. A non-transitory machine-readable storage medium, tangibly embodying a set of instructions that, when executed by at least one processor, causes the at least one processor to perform a set of operations comprising:

storing a localization model that associates location and orientation data with each picture among a plurality of pictures;

receiving a query for a location and an orientation of a device, the query including a first picture and a request to identify a geographic position and a pose of the device based on the first picture;

identifying a second picture, from the localization model, that corresponds to the first picture; and determining the location and the orientation of the device based on the location and orientation data corresponding to the second picture, wherein the location and orientation data indicates position, orientation, three-dimensional geometry, gyroscope measurement, and accelerometer measurement, wherein the device comprises:

a camera configured to capture the picture and generate a plurality of video frames;

at least one inertial sensor configured to generate inertial data of the device; and one or more hardware processors configured to perform operations comprising:

tracking at least one feature in the plurality of video frames;

synchronizing and aligning the plurality of video frames based on the inertial data;

computing a Visual Inertial Navigation (VIN) state of the device based on the synchronized plurality of video frames with the inertial data;

receiving VIN data and corresponding image data from a plurality of devices, the VIN data indicating VIN states and corresponding poses of the plurality of devices; and training, using a neural network, the localization model based on the VIN data and corresponding image data from the plurality of devices, the image data including a plurality of images, the localization model correlating the VIN states and poses with each image among the plurality of images.

* * * * *

UNITED STATES PATENT AND TRADEMARK OFFICE
CERTIFICATE OF CORRECTION

PATENT NO. : 10,614,581 B2  
APPLICATION NO. : 15/880364  
DATED : April 7, 2020  
INVENTOR(S) : Nalin Senthamil Page 1 of 1

It is certified that error appears in the above-identified patent and that said Letters Patent is hereby corrected as shown below:

In the Claims

In Column 19, Line 45, in Claim 12, delete "of claim of claim" and insert --of claim-- therefor In Column 19, Line 52, in Claim 13, delete "of claim of claim" and insert --of claim-- therefor In Column 19, Line 57, in Claim 14, delete "of claim of claim" and insert --of claim-- therefor In Column 20, Line 8, in Claim 15, delete "of claim of claim" and insert --of claim-- therefor Signed and Sealed this  
Seventh Day of July, 2020

Andrei Iancu  
*Director of the United States Patent and Trademark Office*